(12) United States Patent
Lyaskovsky et al.

(10) Patent No.: US 10,387,268 B2
(45) Date of Patent: *Aug. 20, 2019

(54) FAST COPY USING FILE SYSTEM BLOCK MAPPINGS

(75) Inventors: Vitaly Lyaskovsky, Haifa (IL); Eran Raichstein, Yokneam Ilit (IL); Gil Sasson, Haifa (IL); Uri Wolloch, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/531,902

(22) Filed: Jun. 25, 2012

(65) Prior Publication Data
US 2012/0317383 A1 Dec. 13, 2012

Related U.S. Application Data

(63) Continuation of application No. 13/156,284, filed on Jun. 8, 2011.

(51) Int. Cl.
*G06F 3/06* (2006.01)
*G06F 11/14* (2006.01)

(52) U.S. Cl.
CPC .......... *G06F 11/1458* (2013.01); *G06F 3/065* (2013.01); *G06F 3/067* (2013.01); *G06F 3/0611* (2013.01)

(58) Field of Classification Search
None
See application file for complete search history.

(56) References Cited

U.S. PATENT DOCUMENTS

| | | | | |
|---|---|---|---|---|
| 6,804,690 | B1* | 10/2004 | Dysert | G06F 11/1458 |
| 6,912,630 | B1* | 6/2005 | Pillai | G06F 11/1451 |
| | | | | 707/999.202 |
| 7,809,693 | B2 | 10/2010 | Lango et al. | |
| 8,688,636 | B1* | 4/2014 | Barve | G06F 3/065 |
| | | | | 707/620 |
| 2004/0078680 | A1* | 4/2004 | Hu et al. | 714/36 |
| 2004/0267835 | A1 | 12/2004 | Zwilling et al. | |
| 2006/0143501 | A1* | 6/2006 | Tormasov et al. | 714/5 |
| 2007/0124341 | A1* | 5/2007 | Lango et al. | 707/202 |
| 2007/0174673 | A1* | 7/2007 | Kawaguchi | G06F 11/1458 |
| | | | | 714/6.12 |
| 2008/0022032 | A1* | 1/2008 | Nicholas et al. | 711/100 |

(Continued)

FOREIGN PATENT DOCUMENTS

GB 2411030 3/2006

*Primary Examiner* — Edward J Dudek, Jr.
*Assistant Examiner* — Ralph A Verderamo, III
(74) *Attorney, Agent, or Firm* — Griffiths & Seaton PLLC

(57) ABSTRACT

Multiple target blocks are allocated on a first storage device to store a target object. The target blocks are arranged to be in a one-to-one correspondence with multiple source blocks of a source object. The target blocks are set to a non-populated state, and target blocks in the non-populated state are populated with data from corresponding source blocks. While the target blocks are being populated, if a request is received to retrieve data from one of the target blocks that is in the non-populated state, then the one of the target blocks is populated with the data from the corresponding source block and set to a populated state.

6 Claims, 2 Drawing Sheets

(56) References Cited

U.S. PATENT DOCUMENTS

| | | | |
|---|---|---|---|
| 2009/0254592 A1 | 10/2009 | Marinov et al. | |
| 2010/0077160 A1* | 3/2010 | Liu | G06F 3/0482 |
| | | | 711/162 |
| 2010/0082924 A1* | 4/2010 | Yasuda | G06F 11/1456 |
| | | | 711/162 |
| 2012/0117033 A1* | 5/2012 | Vaidya et al. | 707/679 |

* cited by examiner

FAST COPY USING FILE SYSTEM BLOCK MAPPINGS

CROSS REFERENCE TO RELATED APPLICATIONS

This application is a Continuation of U.S. patent application Ser. No. 13/156,284, filed on Jun. 8, 2011.

BACKGROUND OF THE INVENTION

File level backup and block level backup are two techniques employed by computer systems to make additional copies of data. If a data loss event occurs, these additional copies may be used to restore the data. During an initial file level backup, individual files are copied from a primary storage device to a secondary storage device. After the initial backup, subsequent backups (also called incremental backups) only need to copy files from the primary storage device that were modified since the previous backup. In the event of a data loss event, data can be restored by copying the files from the secondary storage device to the primary storage device.

During an initial block level backup (also called an image backup), blocks from the primary storage device are copied to the secondary storage device. After the initial backup, subsequent incremental backups only copy blocks from the primary storage device that were modified since the previous backup. Block level backups are typically more efficient than file level backups since only the modified blocks are copied, not entire modified files.

SUMMARY OF THE INVENTION

There is provided, in accordance with an embodiment of the present invention a method, including allocating multiple target blocks on a first storage device to store a target object, arranging the target blocks to be in a one-to-one correspondence with multiple source blocks of a source object, setting the target blocks to a non-populated state, populating the target blocks in the non-populated state with data from corresponding source blocks, and upon receiving, while populating the target blocks, a request to retrieve data from one of the target blocks that is in the non-populated state, immediately populating the one of the target blocks with the data from the corresponding source block and setting the one of the target blocks to a populated state.

BRIEF DESCRIPTION OF THE DRAWINGS

The disclosure is herein described, by way of example only, with reference to the accompanying drawings, wherein.

SYSTEM DESCRIPTION

Figure 1:
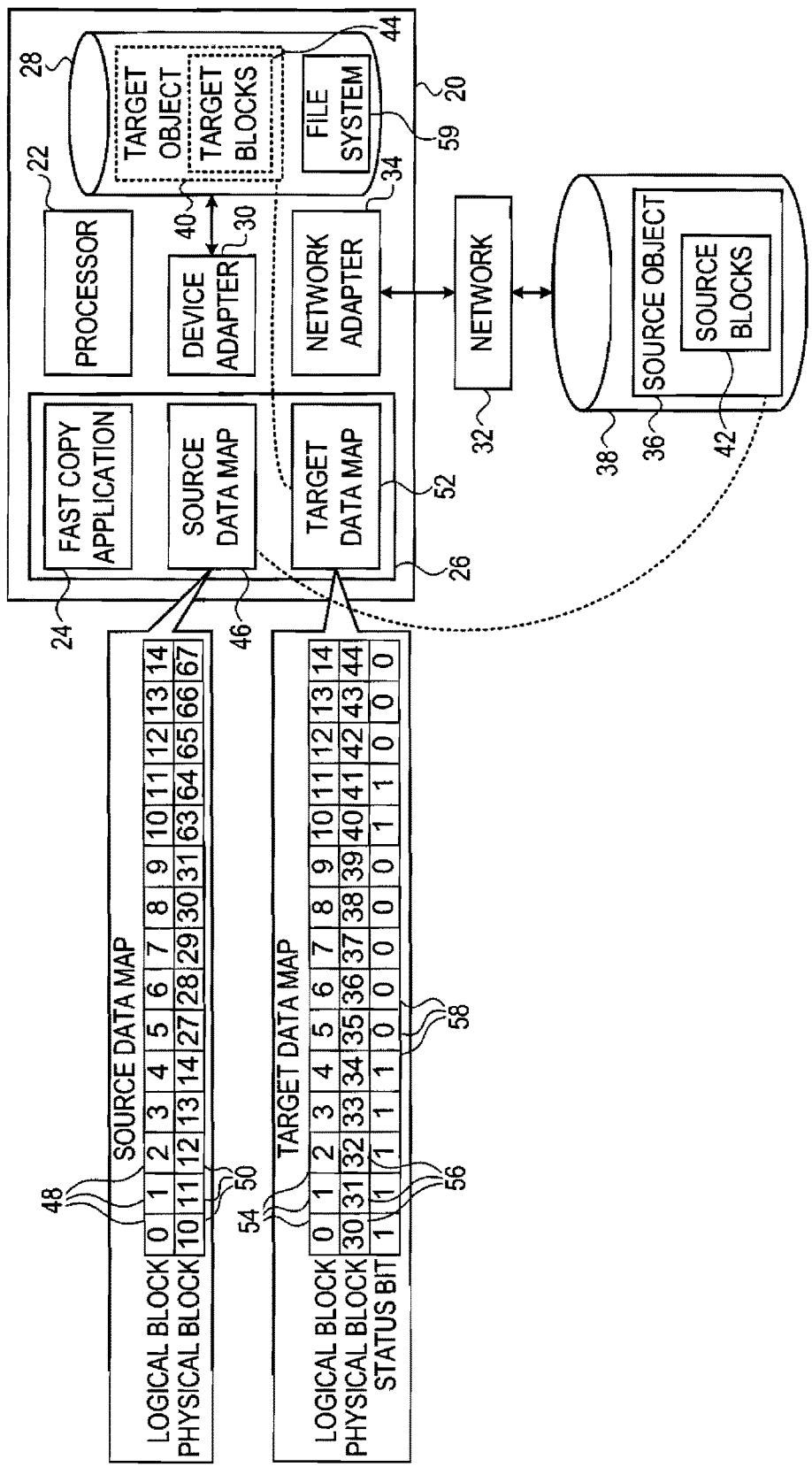
FIG. 1 is a schematic pictorial illustration of a system configured to perform fast copying, in accordance with an embodiment of the present invention.

FIG. 1 is a schematic pictorial illustration of a computer system 20 configured to perform fast copying, in accordance with an embodiment of the present invention. Computer 20 comprises a processor 22 configured to execute a fast copy application 24 from a memory 26. Computer 20 manages a first local storage device 28 (e.g., a disk drive) via a device adapter 30, and is coupled to a network 32 via a network adapter 34.

As described in further detail hereinbelow, fast copy application 24 copies a source object 36 on a second remote storage device 38 to a target object 40 on the local storage device. In the configuration shown in FIG. 1, remote storage device 38 is coupled to network 32, and is typically a component of a remote computer system (not shown). In embodiments where remote storage device 38 is configured as a backup storage device for local storage device 28, fast copy application 24 can be configured to perform an "instant restore" operation (e.g., where source object 36 is a backup file, and the fast copy application restores the backup file to target object 40). Alternatively, storage device 38 may comprise a second storage device coupled to device adapter 30. Further alternatively, source object 36 may be stored on local storage device 28.

Storage devices 28 and 38 typically store data in blocks, where each block is a specific number of bytes (or bits). Source object 36 comprises source blocks 42, and target object 40 comprises target blocks 44. A source data map 46 for source blocks 42, stored in memory 26, stores the relationship between logical blocks 48 of the source object and physical blocks 50 of the remote storage device. For example, if the source and the target objects comprise files, the source data map and the target data map provide a block mapping for the respective files.

A file system 59 stores physical block mappings for objects stored on target storage device 28, including target object 40 (i.e., the file system is associated with the target object). In operation, processor 22 queries file system 59 when accessing files and directories stored on storage device 28.

In the example shown in FIG. 1, source object 36 comprises fifteen logical blocks "0"-"14", where the logical blocks are physically fragmented (i.e., not stored sequentially) on storage device 38. Logical blocks "0"-"4" are stored in physical blocks "10"-"14", logical blocks "5"-"9" are stored in physical blocks "27"-"31", and logical blocks "11"-"14" are stored in physical blocks "63"-"67".

Memory 26 also stores a target data map 52 for target blocks 44, which stores the relationship between logical blocks 54 of the target object and physical blocks 56 of the local storage device. In the example shown in FIG. 1, logical blocks "0"-"14" are stored in a physical sequential sequence on storage device 40 (i.e., physical blocks "30"-"44"). Target data map 52 also comprises a status bit 58 for each logical block 54. Status bits 58 are values in the target data map indicating a status (i.e., if a logical block is populated or non-populated) of each logical block 54. As discussed in detail hereinbelow, upon creating target object 40, processor 22 initializes all the status bits to "0". After copying data from one of source blocks 42 to a corresponding target block 44, processor 22 sets the status bit associated with the corresponding target block to "1".

Processor 22 typically comprises a general-purpose computer configured to carry out the functions described herein. Software operated by the processor may be downloaded to a the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FAST OBJECT COPYING

Figure 2:
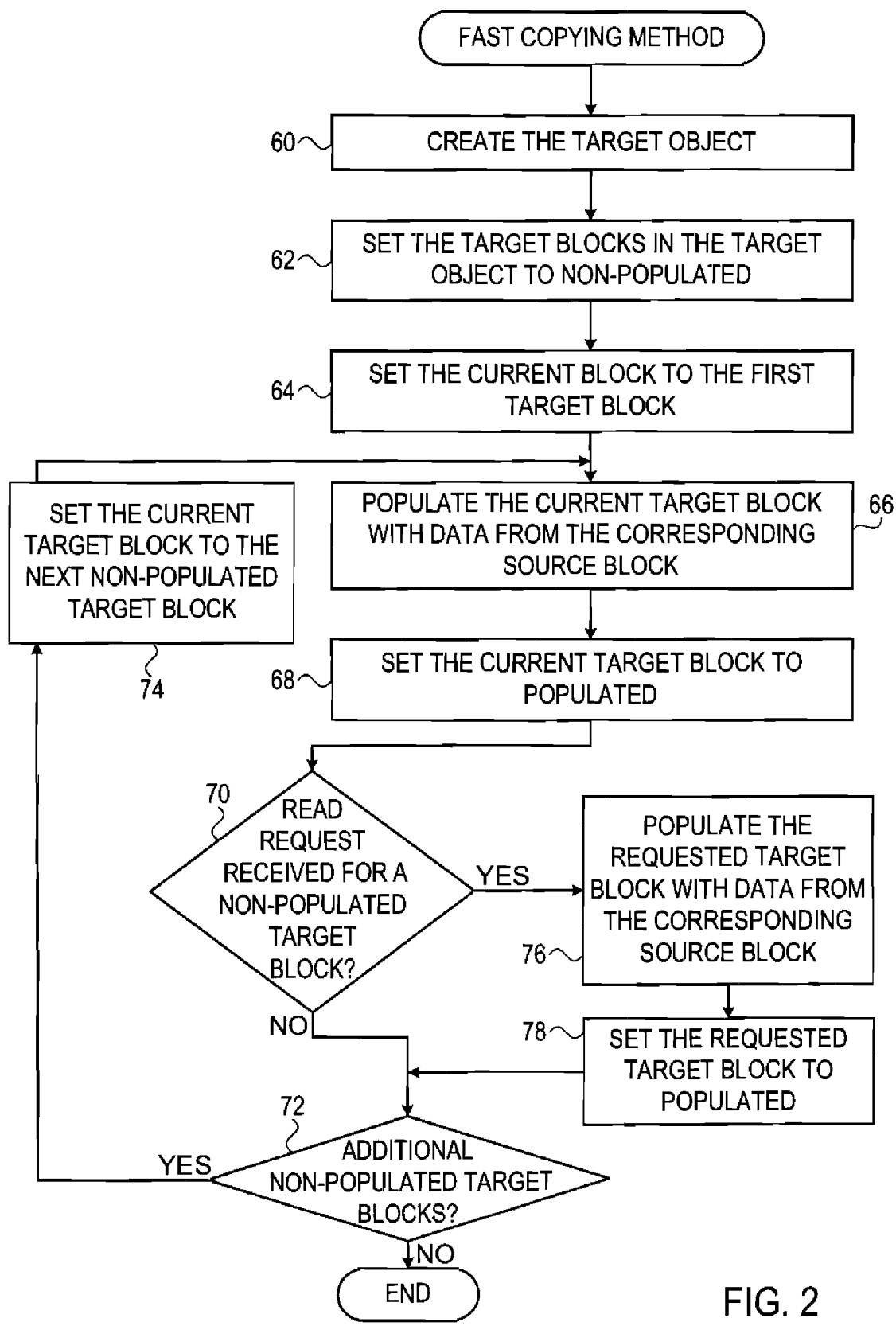
FIG. 2 is a flow diagram that schematically illustrates a method of fast copying, in accordance with an embodiment of the present invention.

FIG. 2 is a flow diagram that schematically illustrates a method of fast copying, in accordance with an embodiment of the present invention. In a preprocessing step 60, fast copy application 24 creates target object 40 on storage device 28 as a "skeleton" object. To create target object 40, processor 22 allocates target blocks 44 on storage device 28 and associates the target blocks with the target object. Once allocated, the target blocks may contain undefined data (i.e., the target blocks do not contain any data from the source object, although they may contain other data).

Typically, the number of target blocks 44 is in accordance with the number of source blocks 42, and processor 22 arranges (i.e., maps) the target blocks to be in a one-to-one correspondence with the source blocks. In some embodiments processor 22 can allocate physical blocks 56 sequentially on storage device 28. Alternatively, processor 22 can allocate physical blocks 56 so that the physical blocks are physically fragments on storage device 28.

For example, if processor 22 is operating in a Windows™ New Technology File System (NTFS) environment, and target object 40 comprises a target file, the processor can call the following functions to create the target object:

CreateFile creates target object 40 on storage device 28. In the example shown in FIG. 1, the target object starts at physical block 30.

SetFilePointerEx sets a pointer to the end of target object 40, based on the desired size (i.e., blocks) of the target object. In the example shown in FIG. 1, since source object 36 comprises fifteen source blocks 42 and target object 40 starts at physical block "30", the pointer will point to physical block "44" (i.e., the fifteenth physical block starting with physical block "30").

SetEndOfFile expands target object 40 to the desired size (i.e., allocates physical blocks "30"-"44" to the target object).

SetFileValidData sets the valid data length for target object 40. In other words, any other application (not shown) accessing target object 40 views all logical blocks 54 of the target object as containing valid data.

In an initialization step 62, fast copy application 24 sets the state of all target blocks 44 to a non-populated state by setting all status bits 58 to "0". Additionally, as described supra, processor 22 queries file system 59 to identify the block mappings of target object 40 (i.e., physical blocks 56). Once processor 22 queries file system 59, target object 40 is active and available for read/write operations.

In a first positioning step 64, fast copy application 24 sets the current block to the first target block 44. In a first populating step 66, the fast copy application populates the target block associated with the current block with data from the corresponding source block, and in a first state set 68, fast copy application sets the state of the current target block to a populated state by storing a "1" to the status bit associated with the current target block.

While copying the source object to the target object using embodiments described herein, the target object is active and appears to be fully populated with the data from the source object. Therefore, during the fast copy process, processor 22 may receive a request to retrieve data from any of target blocks 44, regardless of whether the requested target block is populated or non-populated.

In a first comparison step 70, if processor 22 does not receive a request for a non-populated target block 44, then the method proceeds to a second comparison step 72. In the second comparison step, if fast copy application 24 identifies any remaining non-populated target blocks 44, then in a second positioning step 74, the fast copy application sets the current block to the next non-populated target block 44, and the method continues with step 66 until there are no remaining non-populated target blocks 44. Processor 22 can identify the status of each of target blocks 44 by querying the status bits of the target data map.

Returning to first comparison step 70, if processor 22 receives a request to retrieve data stored in a non-populated target block 44, then, in a second populating step 76, fast copy application immediately populates the requested target block with data from the corresponding source block. The processor then retrieves the newly populated data from the requested target block in order to process the request. In a second state set step 78, fast copy application 24 sets the state of the requested target block to populated by storing a "1" to the status bit associated with the requested target block, and the method continues with step 72. On the other hand, if processor 22 receives a read request for a populated target block, then processor 22 can process the read request without interrupting the fast copy operation.

As described supra, there may be instances when a read request for a non-allocated target block is received during the preprocessing step. For example, the read request may be received while fast copy application 24 is creating metadata for a storage volume comprising multiple directories and files. If the read request for a non-allocated target block is received during the preprocessing step, then the preprocessing step, the second populating step and the second state set step are immediately performed for the requested target block (i.e., fast copy application 24 allocates, populates, and sets the state of the requested target block), and the preprocessing step then returns to the point of interruption.

In some embodiments, populating the target blocks and processing the read requests may be implemented as two processes running in parallel. A first process populates target blocks 44 with data from corresponding source blocks 42 (as shown in steps 66, 68, 72 and 74). A second process processes read requests for target blocks 44. If the requested target block is populated, then the second process retrieves and conveys the data stored in the requested target block. However, if the requested target block is not populated, then the second process handles the request as shown in steps 76 and 78.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method performed by a processor device, comprising:

initiating a fast copy operation of a block level backup on a first storage device;

creating a target object comprising a file within a storage volume by:

starting the target object at a first physical block comprising a first nth storage block within the storage volume on the first storage device, setting a pointer to an end of the target object comprising a second nth storage block within the storage volume based on a desired size of the target object, wherein the end of the target object is located at a second physical block, and a total number of blocks from the first physical block to the second physical block is based on a total number of blocks of a source object comprising the desired size of the target object, expanding, at one time, the target object from the first physical block to the second physical block thereby allocating multiple target blocks on the first storage device for storing the target object and thereby mapping the blocks of the target object to be in a one-to-one correspondence with the blocks of the source object, and setting a valid data length for the target object to allow applications accessing the target object to view all the target blocks expanded at one time and allocated to the target object as containing valid data; wherein the target blocks do not contain data from the source object notwithstanding whether the target blocks contain other data;

setting the target blocks to a non-populated state;

presenting the target blocks as available for Input/Output (I/O) operations such that the applications accessing the target object assume the target blocks are populated;

populating the target blocks in the non-populated state with data from corresponding source blocks;

upon receiving, while allocating the target blocks during a preprocessing stage of the fast copy operation comprising creating metadata for a plurality of files and directories within the storage volume prior to creating the target object, a request to retrieve data from one of the target blocks that is in the non-populated state, interrupting the fast copy operation and immediately populating the one of the target blocks with the data from the corresponding source block and setting the one of the target blocks to a populated state; wherein subsequent to the populating, the fast copy operation is resumed at the point of interruption such that the creation of the metadata for the plurality of files and directories within the storage volume of the preprocessing stage is continued at the point of interruption; and querying status bits of a target data map having a plurality of the status bits associated with a plurality of target objects to identify a status of each target block corresponding to the plurality of target objects;

wherein the source object and the target object are stored on the first storage device.

2. The method according to claim 1, and comprising, upon allocating the target blocks, querying a file system associated with the target object to identify physical block mappings of the target object.

3. The method according to claim 1, wherein setting the target blocks to the non-populated state comprises storing a value indicating the non-populated state to data map locations associated with the target blocks.

4. The method according to claim 1, and comprising setting the target blocks to the populated state upon populating the target blocks in the non-populated state with data from corresponding source blocks.

5. The method according to claim 1, wherein setting the one of the target blocks to the populated state comprises storing a value indicating the populated state to a data map location associated with the one of the target blocks.

6. A method performed by a processor device, comprising:

initiating a fast copy operation of a block level backup on a first storage device;

creating a target object comprising a file within a storage volume by:

starting the target object at a first physical block comprising a first nth storage block within the storage volume on the first storage device, setting a pointer to an end of the target object comprising a second nth storage block within the storage volume based on a desired size of the target object, wherein the end of the target object is located at a second physical block, and a total number of blocks from the first physical block to the second physical block is based on a total number of blocks of a source object comprising the desired size of the target object, expanding, at one time, the target object from the first physical block to the second physical block thereby allocating multiple target blocks on the first storage device for storing the target object and thereby mapping the blocks of the target object to be in a one-to-one correspondence with the blocks of the source object, and setting a valid data length for the target object to allow applications accessing the target object to view all the target blocks expanded at one time and allocated to the target object as containing valid data; wherein the target blocks do not contain data from the source object notwithstanding whether the target blocks contain other data;

setting the target blocks to a non-populated state;

presenting the target blocks as available for Input/Output (I/O) operations such that the applications accessing the target object assume the target blocks are populated;

populating the target blocks in the non-populated state with data from corresponding source blocks;

upon receiving, while allocating the target blocks during a preprocessing stage of the fast copy operation comprising creating metadata for a plurality of files and directories within the storage volume prior to creating the target object, a request to retrieve data from one of the target blocks that is in the non-populated state, interrupting the fast copy operation and immediately allocating the one of the target blocks, arranging the one of the target blocks to be in a one-to-one correspondence with one of the source blocks, populating the one of the target blocks with the data from the corresponding source block, and setting the one of the target blocks to a populated state; wherein subsequent to the populating, the fast copy operation is resumed at the point of interruption such that the creation of the metadata for the plurality of files and directories within the storage volume of the preprocessing stage is continued at the point of interruption; and querying status bits of a target data map having a plurality of the status bits associated with a plurality of target objects to identify a status of each target block corresponding to the plurality of target objects;

wherein the source object and the target object are stored on the first storage device.

* * * * *